US011897108B2

(12) United States Patent
Murdoch et al.

(10) Patent No.: US 11,897,108 B2
(45) Date of Patent: Feb. 13, 2024

(54) TOOL WITH CHARGE ADVANCE MECHANISM

(71) Applicant: Illinois Tool Works Inc., Glenview, IL (US)

(72) Inventors: Thomas James Murdoch, Warooka (AU); Pau Van De Loo, Norton Summit (AU); Kade Richard Turner, Bowden (AU)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 18/153,538

(22) Filed: Jan. 12, 2023

(65) Prior Publication Data

US 2023/0145061 A1 May 11, 2023

Related U.S. Application Data

(63) Continuation of application No. 17/409,959, filed on Aug. 24, 2021, now Pat. No. 11,577,373, which is a (Continued)

(30) Foreign Application Priority Data

Oct. 27, 2017 (AU) ................................ 2017904368
Oct. 16, 2018 (AU) ................................ 2018250391

(51) Int. Cl.
*B25C 1/18* (2006.01)
*B25C 1/08* (2006.01)
*B25C 7/00* (2006.01)

(52) U.S. Cl.
CPC .............. *B25C 1/186* (2013.01); *B25C 1/085* (2013.01); *B25C 7/00* (2013.01)

(58) Field of Classification Search
CPC ......... B25C 1/186; B25C 1/085; B25C 1/182; B25C 1/10; B25C 1/18; B25C 7/00
See application file for complete search history.

(56) References Cited

U.S. PATENT DOCUMENTS 3,493,163 A * 2/1970 Hodil, Jr. ................ B25C 1/182 227/9
3,910,477 A 10/1975 Kavan
(Continued)

FOREIGN PATENT DOCUMENTS

CA 2295398 A1 7/2000
DE 2044920 A1 * 3/1972 ............. B25C 1/186
(Continued)

OTHER PUBLICATIONS

Machine Translation of DE 2044920 A1 (Year: 2020).*

*Primary Examiner* — Anna K Kinsaul
*Assistant Examiner* — Veronica Martin
(74) *Attorney, Agent, or Firm* — Neal, Gerber & Eisenberg LLP

(57) ABSTRACT

A powder actuated fastening tool including a charge advance apparatus for advancing a powder charge strip relative to a barrel of the tool, wherein the charge advance apparatus includes a rotatable ratchet having teeth for engaging receptacles formed in the powder charge strip, and a charge advance member coupled to a trigger of the tool, wherein the charge advance member acts on the rotatable ratchet to rotate the ratchet in response to actuation and/or release of the trigger, such that the rotation of the ratchet causes advance of the powder charge strip relative to the barrel.

20 Claims, 13 Drawing Sheets

Related U.S. Application Data continuation of application No. 16/168,320, filed on Oct. 23, 2018, now Pat. No. 11,123,851.

(56) References Cited

U.S. PATENT DOCUMENTS

| | | | |
|---|---|---|---|
| 3,929,269 | A | 12/1975 | Hodil |
| 4,804,127 | A | 2/1989 | Kirkman |
| 4,821,938 | A | 4/1989 | Haytayan |
| 5,273,198 | A | 12/1993 | Popovich et al. |
| 5,829,661 | A | 11/1998 | Hirtl et al. |
| 6,272,782 | B1 | 8/2001 | Dittrich et al. |
| 6,343,535 | B1 | 2/2002 | Gaudron |
| 6,378,752 | B1 | 4/2002 | Gaudron |
| 6,880,738 | B2 | 4/2005 | Neumann et al. |
| 6,981,630 | B2 | 1/2006 | Popovich et al. |
| 7,021,511 | B2 | 4/2006 | Popovich et al. |
| 7,048,166 | B2 | 5/2006 | Pfister et al. |
| 7,096,577 | B2 | 8/2006 | Mccullough |
| 7,232,050 | B2 | 6/2007 | Omli |
| 7,237,705 | B2 | 7/2007 | Gaudron |

FOREIGN PATENT DOCUMENTS

| | | | |
|---|---|---|---|
| DE | 2044920 | A1 | 3/1972 |
| DE | 8804151 | U1 | 5/1988 |
| EP | 1403006 | A1 | 3/2004 |

* cited by examiner

TOOL WITH CHARGE ADVANCE MECHANISM

PRIORITY

This application is a continuation of and claims priority to and the benefit of U.S. patent application Ser. No. 17/409,959, filed on Aug. 24, 2021, which is a continuation of, and claims priority to and the benefit of U.S. patent application Ser. No. 16/168,320, filed on Oct. 23, 2018, now issued as U.S. Pat. No. 11,123,851, on Sep. 21, 2021, which claims priority to and the benefit of Australian Patent Application No. 2018250391, which was filed on Oct. 16, 2018, and claims priority to and the benefit of Australian Patent Application No. 2017904368, which was filed on Oct. 27, 2017, the entire contents of each of which are incorporated herein by reference.

FIELD

The present disclosure relates generally to a tool with a charge advance mechanism and, more specifically but not exclusively, to a powder actuated fastening tool having a charge advance mechanism for advancing a strip of powder charges relative to the tool.

BACKGROUND

It is has been previously proposed to provide a powder actuated fastening tool which operates on a strip of explosive powder charges to drive fasteners into a workpiece. It is necessary for the powder charge strip to be driven progressively through the tool such that the strip is moved through the tool so that successive charges are used for firing successive fasteners through a barrel of the tool. In this way, it is desirable that each of the powder charges in the strip is progressively depleted to drive the fasteners from the fastening tool.

However, the applicant has identified that there is a problem with existing powder actuated fastening tools in that the powder charge strip may not be accurately or adequately moved through the tool such that a charge may be out of alignment with the barrel, raising the problem of potentially having charges damaged by the tool or even activated outside of the barrel of the tool, which may be potentially dangerous or at least destructive to the tool.

Examples of the present disclosure seek to provide an improved tool with charge advance mechanism which may avoid or at least ameliorate disadvantages of existing powder actuated tools.

SUMMARY

In accordance with one aspect of the present disclosure, there is provided a powder actuated fastening tool including a charge advance apparatus for advancing a powder charge strip relative to a barrel of the tool, wherein the charge advance apparatus includes a rotatable ratchet having teeth for engaging receptacles formed in the powder charge strip, and a charge advance member coupled to a trigger of the tool, wherein the charge advance member acts on the rotatable ratchet to rotate the ratchet in response to actuation and/or release of the trigger, such that the rotation of the ratchet causes advance of the powder charge strip relative to the barrel.

Preferably, the barrel has mounted thereon an alignment member which moves relative to the ratchet when the barrel is brought from the open position to the closed position to ensure a charge of the powder charge strip is in alignment with the barrel.

More preferably, when the barrel is brought from the open position to the closed position, the alignment member is moved into abutment with the ratchet to prevent the ratchet from rotating, thereby preventing the charge from moving out of alignment with the barrel.

Even more preferably, the rotatable ratchet has a plurality of straight sides, such that when the barrel is brought from the open position to the closed position, the alignment member is moved into abutment with one of the straight sides to prevent rotation of the ratchet.

Even more preferably, the alignment member is moved into abutment with said straight side in a direction parallel to the straight side. In one form, the alignment member is in the form of an elongated rod.

Preferably, the rotatable ratchet is hexagonal.

Preferably, the rotatable ratchet is arranged to pivots about a central axis of the rotatable ratchet. In one form, the central axis is perpendicular to a longitudinal axis of the elongated rod. More preferably, the rotatable ratchet is provided with a series of ratchet ramps equally spaced in a circular arrangement around the central axis. Even more preferably, the ratchet ramps are arranged such that one ratchet ramp coincides to one charge of the charge strip, with rotation of the ratchet by one ratchet ramp corresponding with movement of the strip by one powder charge.

Preferably, the rotatable ratchet is mounted to permit tilting of the ratchet, with a central spring biasing the ratchet to an untilted configuration.

Preferably, each of the teeth has an involute profile to facilitate meshing with the strip.

In a preferred form, the charge advance member is in the form of an arm. More preferably, the arm is fixed to the trigger to move with the trigger as the trigger is pulled by the user. Even more preferably, the arm is arranged to deflect laterally over one ratchet ramp on pulling of the trigger. In one form, the arm has a catch for engaging with said ratchet ramp to drive rotation of the ratchet on return of the trigger.

In accordance with another aspect of the present disclosure, there is provided a powder actuated fastening tool including a charge advance apparatus for advancing a powder charge strip relative to a barrel of the tool, wherein the charge advance apparatus includes a rotatable ratchet having teeth for engaging receptacles formed in the powder charge strip, wherein the barrel is slideably mounted between an open position in which the barrel is spaced from the charge and a closed position in which the barrel encloses the charge, wherein the barrel has mounted thereon an alignment member which moves relative to the ratchet when the barrel is brought from the open position to the closed position to ensure a charge is in alignment with the barrel.

Preferably, the tool includes a charge advance member coupled to a trigger of the tool, wherein the charge advance member acts upon the rotatable ratchet to rotate the ratchet in response to actuation and/or release of the trigger, such that the rotation of the ratchet causes advance of the powder charge strip.

BRIEF DESCRIPTION OF THE DRAWINGS

The present disclosure is described, by way of non-limiting example only, with reference to the accompanying drawings, in which.

DETAILED DESCRIPTION

With reference to FIGS. 1 to 29 of the drawings, there is shown a powder actuated fastening tool 10 having a charge advance apparatus 12 which, advantageously, ensures that a strip of powder charges is accurately and adequately advanced through the tool 10 such that the charges are properly aligned with a barrel of the tool 10 for safe and effective operation of the tool.

Figure 1:
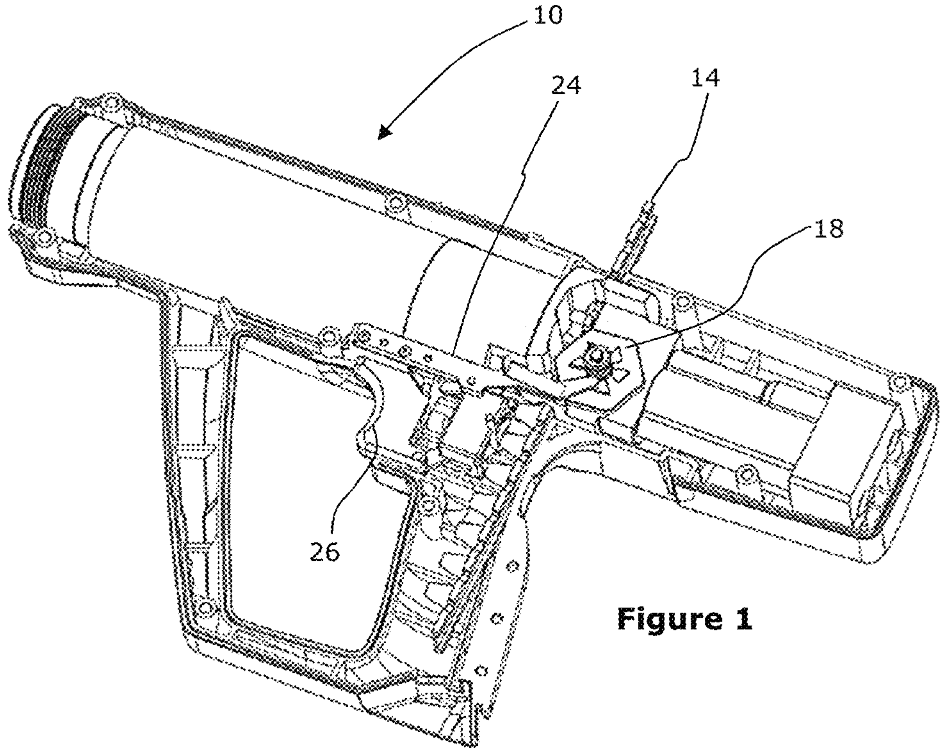
FIG. 1 shows a perspective view of a partially dismantled tool having a charge advance mechanism in accordance with an example of the present disclosure.
Figure 2:
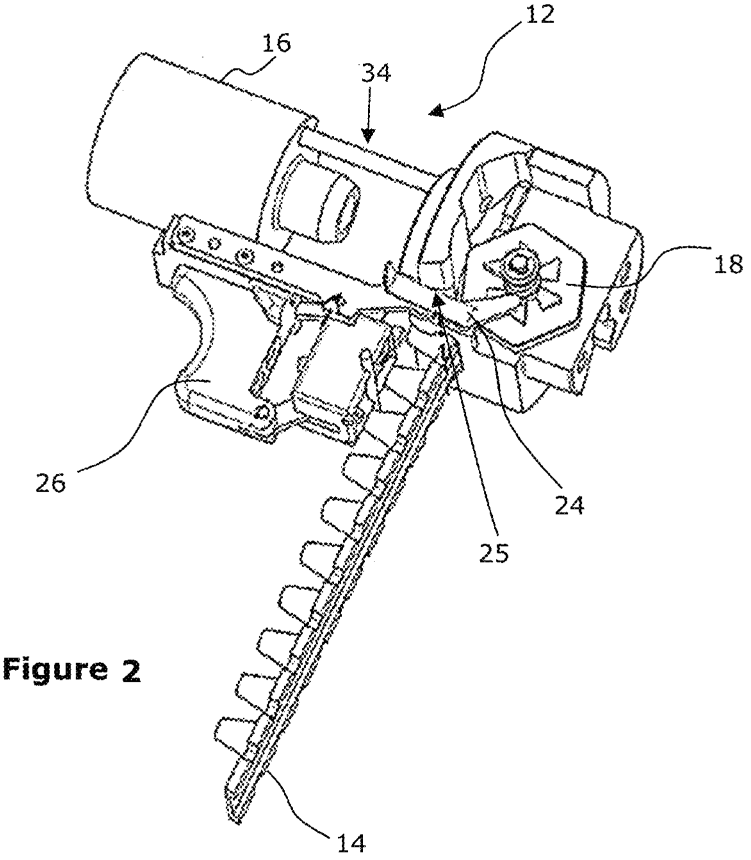
FIG. 2 shows a perspective view of the charge advance mechanism.

More specifically, with reference to FIGS. 1 and 2 of the drawings, the charge advance apparatus 12 is for advancing a powder charge strip 14 relative to a barrel 16 of the tool 10. The charge advance apparatus 12 includes a rotatable ratchet 18 having teeth 20 for engaging receptacles 22 formed in the powder charge strip 14. In the example shown, the charge advance apparatus 12 also includes a charge advance member 24, in the form of a charge advance lever, coupled to a trigger 26 of the tool 10. The charge advance member 24 acts on the rotatable ratchet 18 to rotate the ratchet 18 (shown in FIG. 2 in the form of a ratchet wheel) in response to actuation and/or release of the trigger 26, such that the rotation of the ratchet 18 causes advance of the powder charge strip 14 relative to the section of barrel 16 shown in FIG. 2. In FIG. 1, the tool 10 is shown in an assembled form without a left hand side housing. As shown in FIG. 2, a cantilever spring 25 may be provided for biasing a distal end of the charge advance member 24 toward the rotatable ratchet 18.

Figure 3:
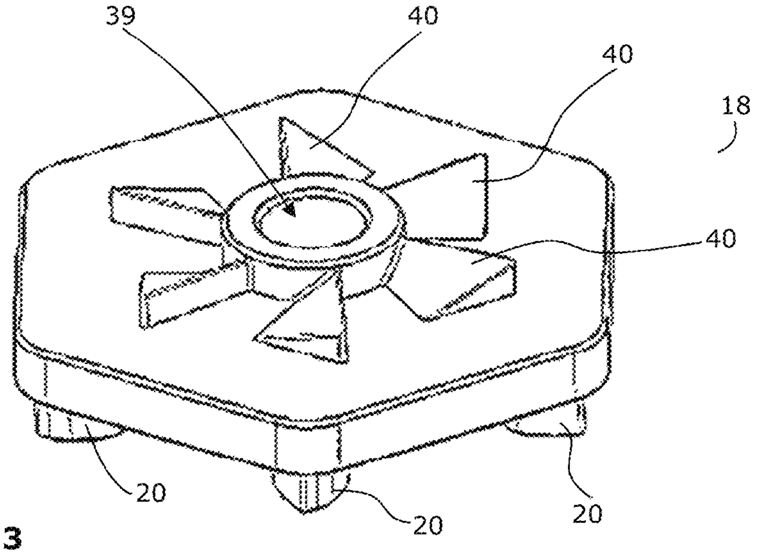
FIG. 3 shows a perspective view of a rotatable ratchet of the charge advance mechanism.
Figure 4:
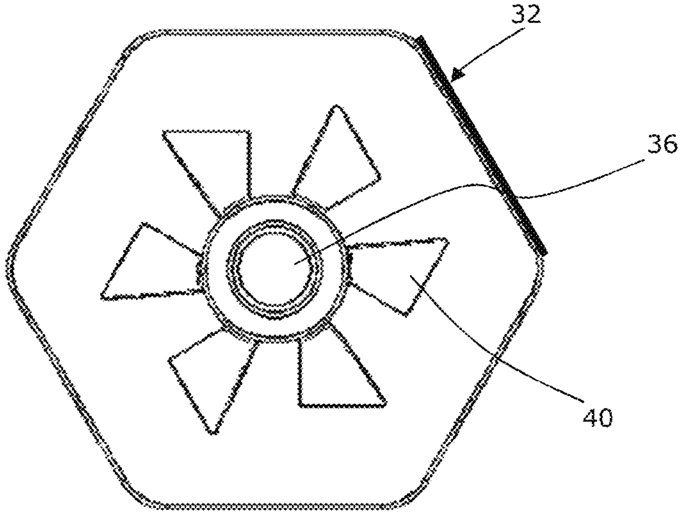
FIG. 4 shows a top view of the ratchet.
Figure 5:
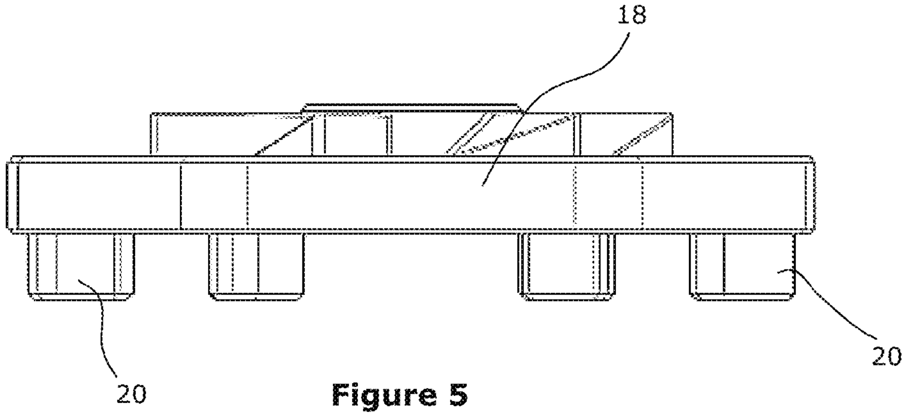
FIG. 5 shows a side view of the ratchet.
Figure 6:
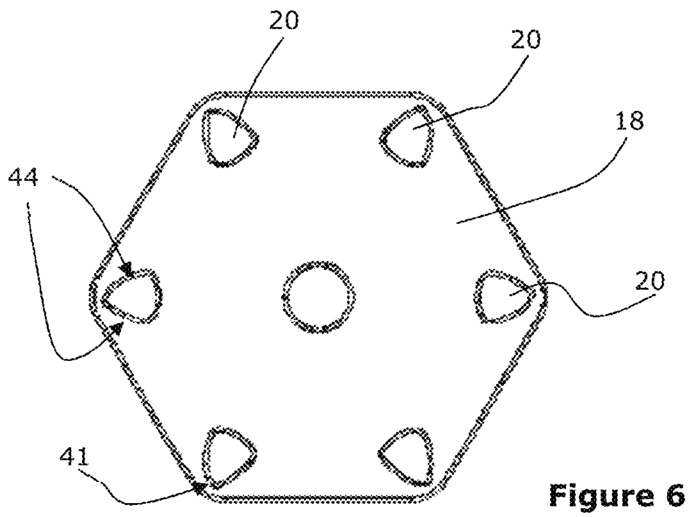
FIG. 6 shows a bottom view of the ratchet.

Detail of the rotatable ratchet 18 is shown in FIGS. 3 to 6 of the drawings. With reference to FIG. 3, an inner bore of the rotatable ratchet 18 wheel is tapered, having a tapered base 39, allowing the wheel to pivot, allowing the wheel's pins to lift out of the way upon insertion of the charge strip 14. FIG. 4 shows the rotatable ratchet 18 wheel, showing ramp profile and hexagonal alignment features. Turning to FIG. 5, the optimal pin/tooth profile that engages with the charge strip 14 is a modified involute profile in which one side of each pin tip is chamfered, to have a chamfered tooth tip 41, so as to provide clearance for the charge strip 14. Replacing the involute pin profile with a circular pin will also function as intended. FIG. 6 shows the rotatable ratchet 18 wheel with modified involute profile pins/teeth on a reverse face thereof.

With reference to FIGS. 7 to 11, the barrel 16 has mounted thereon an alignment member 28 (shown in the form of a lockout pin) which moves relative to the rotatable ratchet 18 when the barrel 16 is brought from the open position (see FIG. 7) to the closed position (see FIG. 8) to ensure a charge 30 of the powder charge strip 14 is in alignment with the barrel 16. When the barrel 16 is brought from the open position to the closed position, the alignment member 28 is moved into abutment with the ratchet 18 to prevent the ratchet 18 from rotating, thereby preventing the charge 30 from moving out of alignment with the barrel 16. The rotatable ratchet 18 has a plurality of straight sides 32, such that when the barrel 16 is brought from the open position to the closed position, the alignment member 28 is moved into abutment with one of the straight sides 32, along the length of the straight side 32, to prevent rotation of the ratchet 18. As can be seen from FIGS. 7 and 8, the alignment member 28 is moved into abutment with the straight side 32 in a direction parallel to the straight side 32. In particular, the alignment member 28 is in the form of an elongated rod 34 and the rotatable ratchet 18 is hexagonal in shape.

As can also be seen in FIGS. 7 to 11, the rotatable ratchet 18 is arranged to pivot about a central axis 36 of the rotatable ratchet 18. The central axis 36 is perpendicular to a longitudinal axis 38 of the elongated rod 34. Turning to the detail shown in FIGS. 3 to 6, the rotatable ratchet 18 is provided with a series of ratchet ramps 40 equally spaced in a circular arrangement around the central axis, as best seen in FIG. 4. The ratchet ramps 40 are arranged such that one ratchet ramp 40 coincides to one charge 30 of the charge strip 14, with rotation of the ratchet 18 by one ratchet ramp 40 corresponding with movement of the strip 14 by one powder charge 30.

Figure 24:
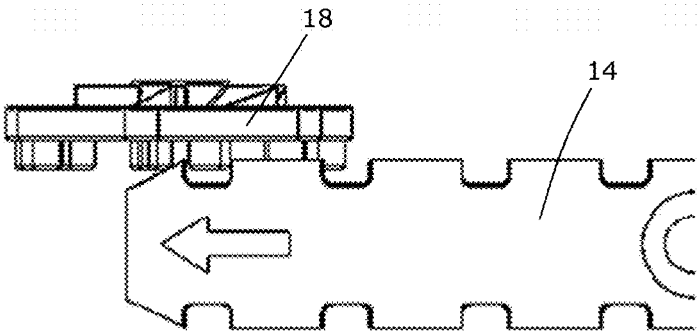
Figure 25:
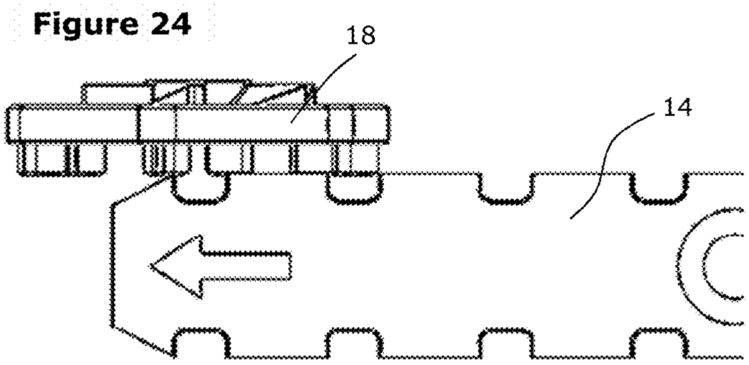

The rotatable ratchet 18 is mounted to permit tilting of the ratchet 18, and also raising of the ratchet 18 as shown in FIGS. 24 and 25 of the drawings. Tilting is permitted by virtue of a central spring 42 which biases the ratchet 18 to an untilted configuration, shown most clearly in FIG. 29 where the rotatable ratchet 18 lies perpendicular to the central axis 36 about which it rotates.

As shown in FIG. 6, each of the teeth 20 has an involute profile 44 to facilitate meshing of the teeth 20 with the receptacles 22 of the powder charge strip 14. Tips of the teeth 20 may also be chamfered to facilitate efficient meshing with the powder charge strip 14.

Figure 10:
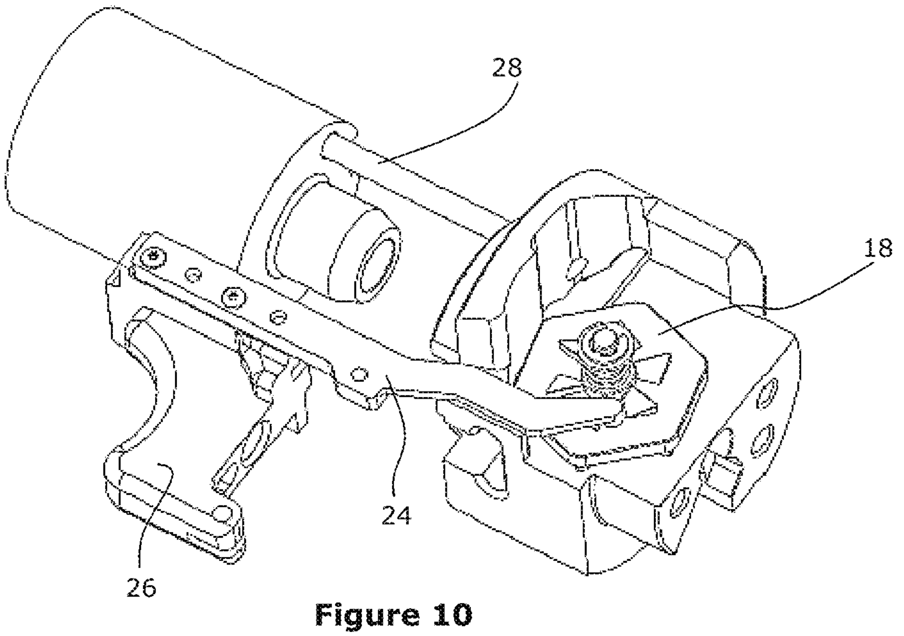
FIG. 10 shows a perspective view of the charge advance mechanism with the barrel in the open position and the trigger driving rotation of the ratchet.
Figure 11:
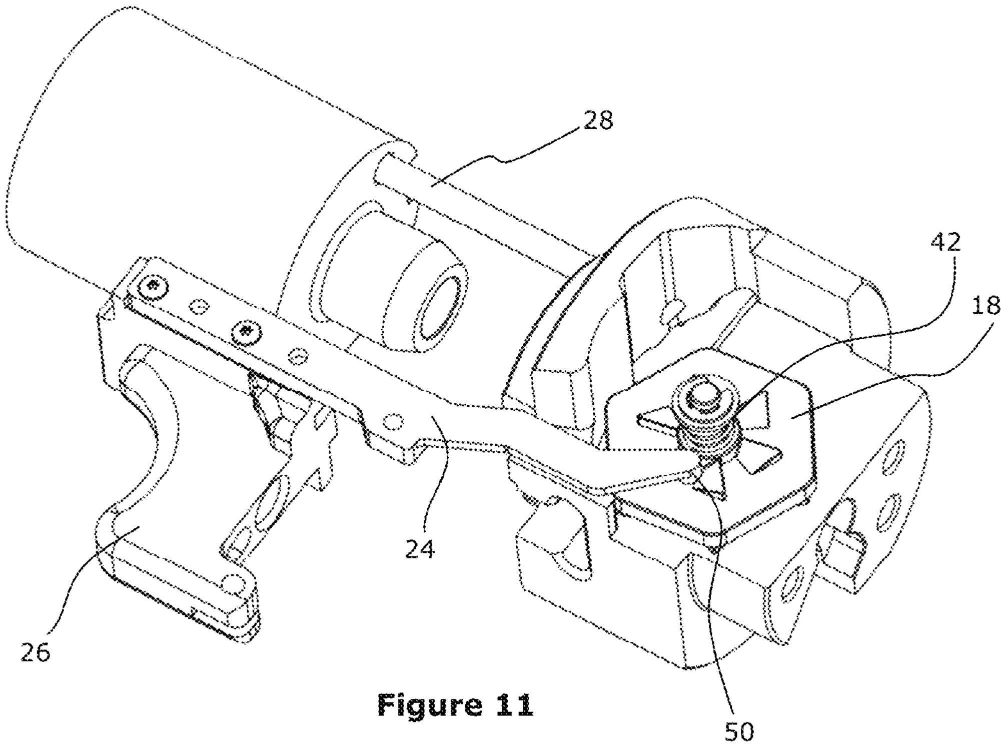
FIG. 11 shows a perspective view of the charge advance mechanism with the barrel in the open position and the trigger returned to the rest position.
Figure 12:
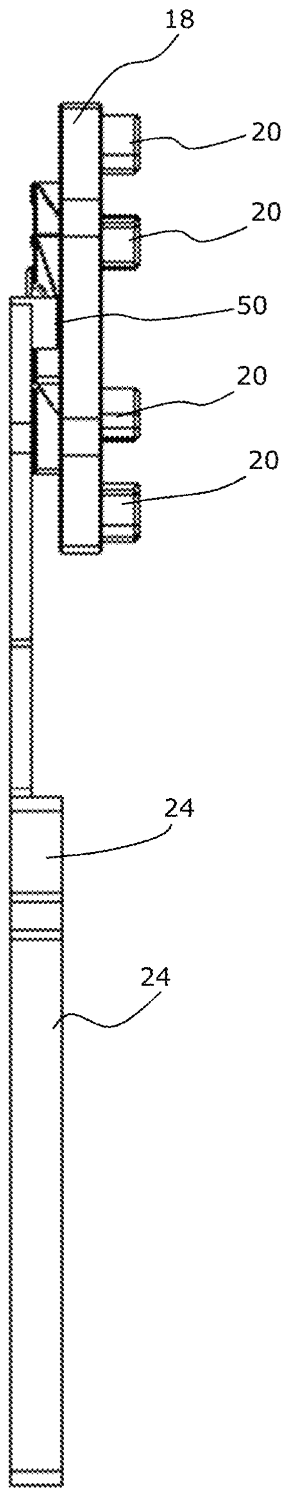
FIG. 12 shows an underside view of a charge advance member coupled to the trigger in a first stage of a deployment cycle of the tool.
Figure 13:
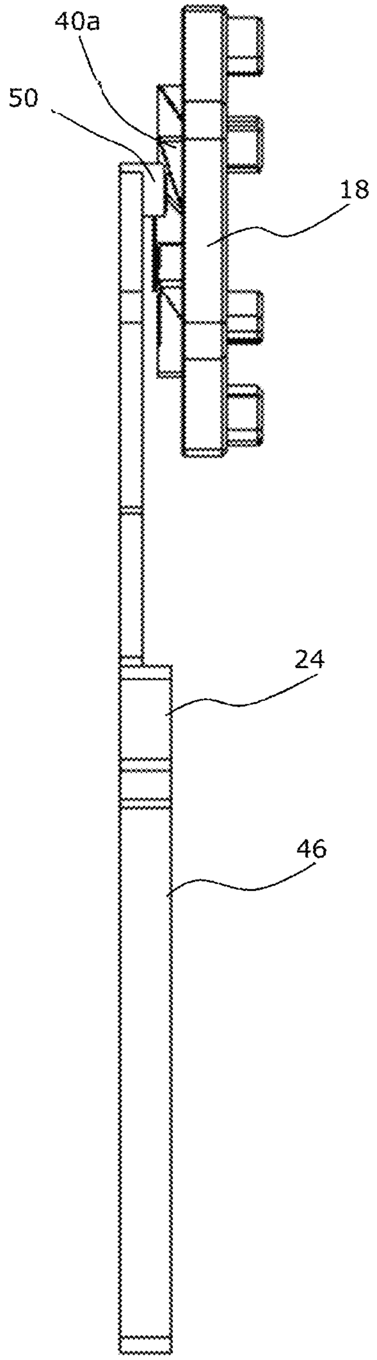
FIG. 13 shows the charge advance member relative to the ratchet in a second stage of the deployment cycle.
Figure 14:
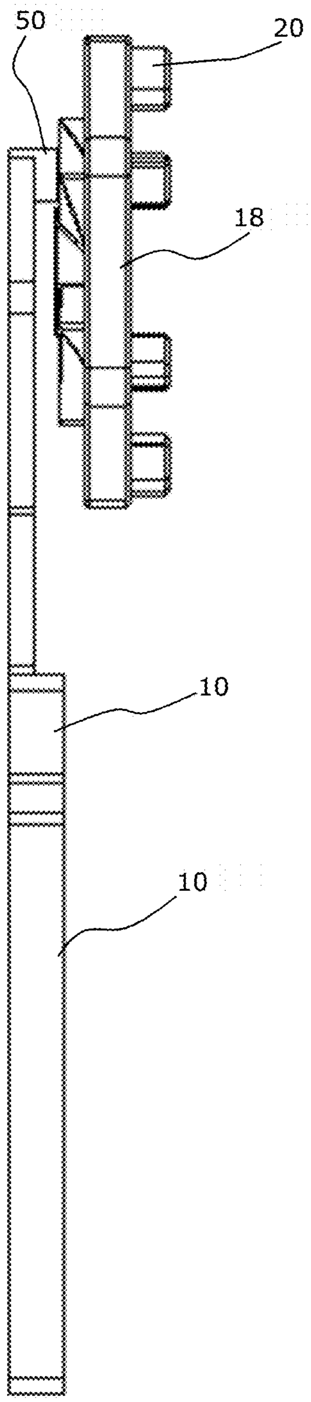
FIG. 14 shows a third stage of the deployment cycle.
Figure 15:
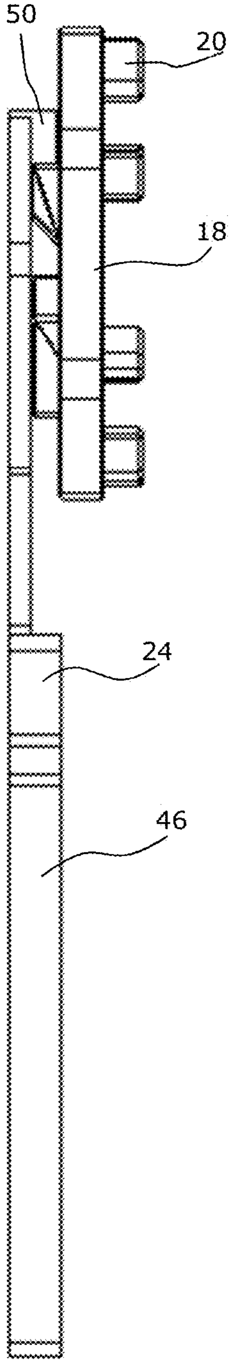
FIG. 15 shows a fourth stage of the deployment cycle.

As shown in FIGS. 7 to 11, the charge advance member 24 may be in the form of an arm 46 which is fixed to the trigger 26 by way of fasteners 48 such that the arm 46 moves with the trigger 26 as the trigger 26 is pulled by the user. Detail of the arm 46 is shown in FIGS. 12 to 15, specifically showing the manner in which the arm 46 cooperates with the rotatable ratchet 18 during pulling back of the trigger in cyclic operation of the powder actuated fastening tool 10. FIG. 12 shows the charge advance lever in a home position; FIG. 13 shows the charge advance lever protrusion engaged with the sawtooth ramp; FIG. 14 shows the charge advance lever protrusion on top of sawtooth ramp; and FIG. 15 shows the charge advance lever protrusion advanced over the sawtooth ramp. Specifically, as can be seen in FIGS. 13 and 14, the arm 46 is arranged to deflect laterally over one ratchet ramp 40*a* on pulling of the trigger 26 such that the tip of the arm 46 rides upwardly over the ratchet ramp 40*a*. The arm 46 also has a catch 50 for engaging with said ratchet ramp 40*a* to drive rotation of the rotatable ratchet 18 on return of the trigger 26, in the configuration shown in FIG. 15 in which the arm 46 has ridden over the ratchet ramp 40*a* that the catch 50 engages with an edge of the ratchet ramp 40*a*. Also, the trigger 26 may be provided with a degree of free lateral movement or "play" to assist the catch 50 in moving laterally to ride over the ratchet ramp 40*a*.

Accordingly, as discussed above, FIGS. 7 to 11 show the process of firing the tool 10 and advancing to the next charge highlighting only the parts required for the charge advance mechanism/system 12.

Figure 7:
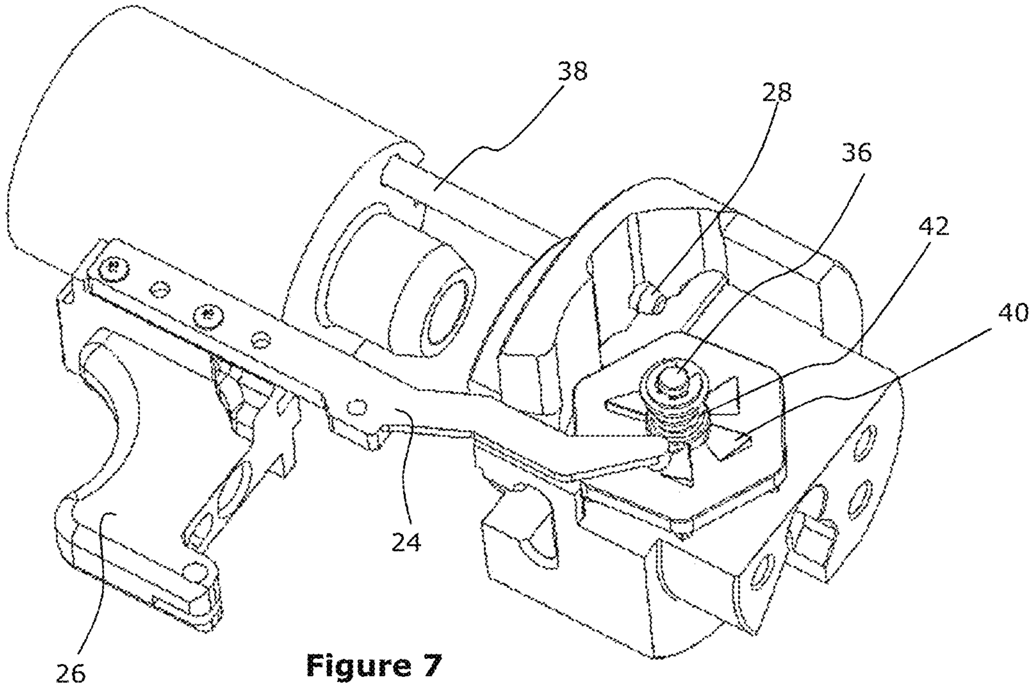
FIG. 7 shows a perspective view of the charge advance mechanism with the barrel in an open position.
Figure 8:
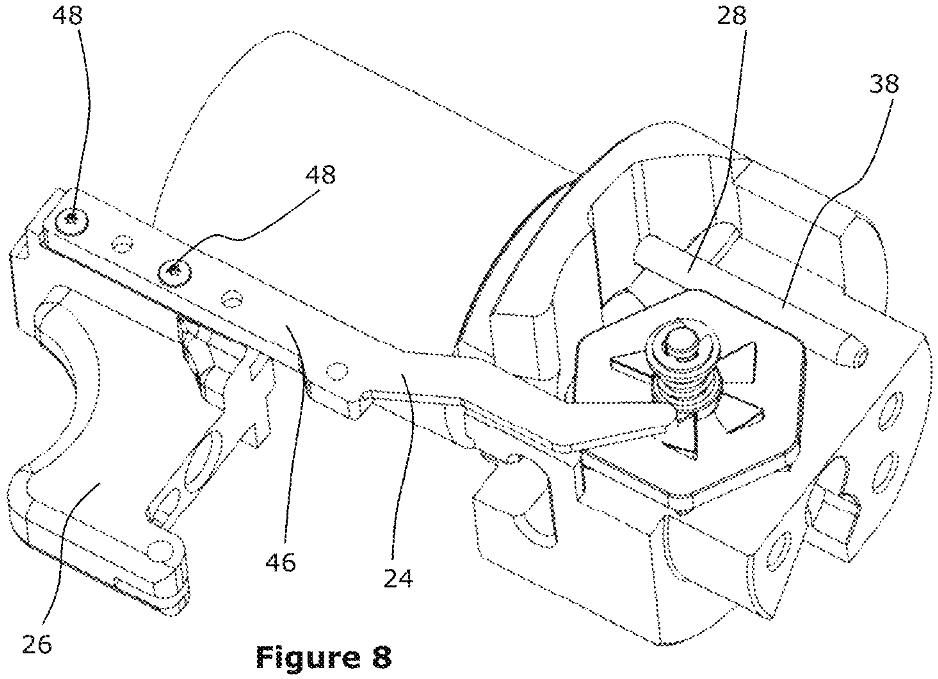
FIG. 8 shows a perspective view of the charge advance mechanism with the barrel in a closed position.
Figure 9:
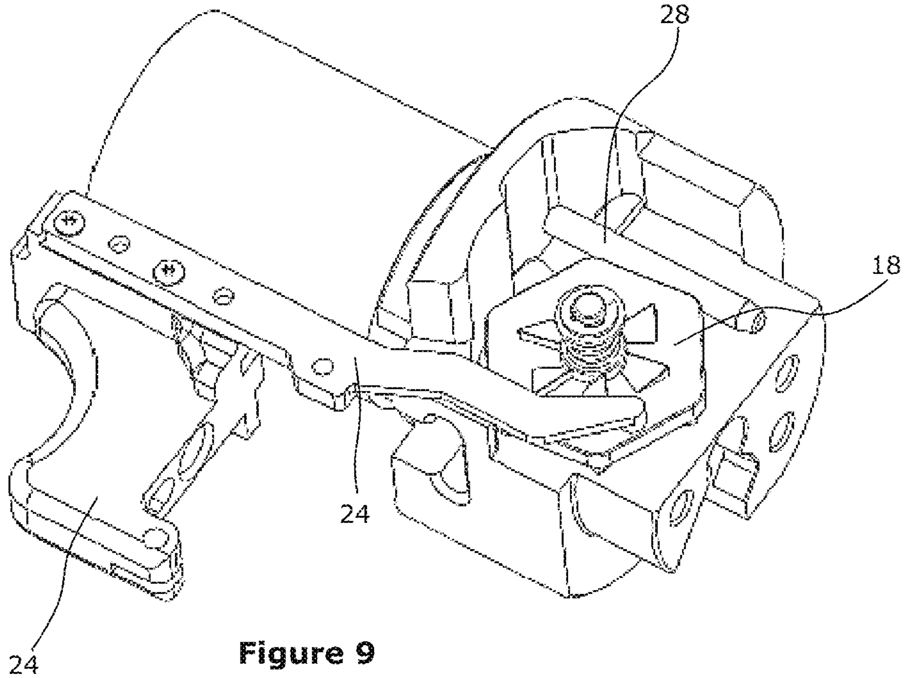
FIG. 9 shows a perspective view of the charge advance mechanism with the barrel in the closed position and the trigger pulled back.

FIG. 7 shows the tool 10 in the uncocked state; FIG. 8 shows the tool 10 cocked; FIG. 9 shows the trigger 26 actuated; FIG. 10 shows the tool uncocked and the trigger released; and FIG. 11 shows the tool returned to the uncocked state. Upon cocking the tool 10 by pressing the barrel 16 into the work piece, the lockout pin (which serves as an alignment member and is part of the barrel assembly) rotates the ratchet wheel 18 ensuring the charge strip 14 is correctly aligned (FIG. 8).

The ratchet wheel 18 has a number of sawtooth ramp-shaped features 40 on its face, arranged in a circle about the axis of rotation, as shown in FIG. 3. The charge advance lever 24 has a protrusion 50 that engages with these ramps 50, allowing the advance lever 24 to rotate the ratchet wheel 18 in one direction, as shown in FIGS. 12 to 15. When the trigger 26 is actuated, the charge advance lever 24 clicks over the sawtooth ramp feature 40*a* of the ratchet wheel 18 with the cantilever spring used to ensure the lever 24 remains engaged with the ramp (see FIG. 9). Slightly after the lever 24 has clicked over the ramp 40*a*, the tool 10 will fire. This is due to the operation of the firing mechanism (not shown).

Upon uncocking of the barrel 16, the lockout pin 28 disengages with the ratchet wheel 18 along with the barrel breech disengaging from the charge. At this point, when the trigger 26 is released, the charge advance lever 24 pulls on the vertical face of the ratchet wheel's ramp 40*a* causing the ratchet wheel 18 to rotate (see FIG. 10 and FIG. 11). Pins/teeth 20 on the ratchet wheel 18 engage with mating slots/receptacles in the charge strip 14, acting as rack and pinion gearing. Upon rotation of the ratchet wheel 18, the charge strip 14 is pulled through the breech by the pins/teeth 20. The engagement of the pins/teeth with the slots/receptacles in the charge strip 14 is shown in FIG. 26.

Figure 16:
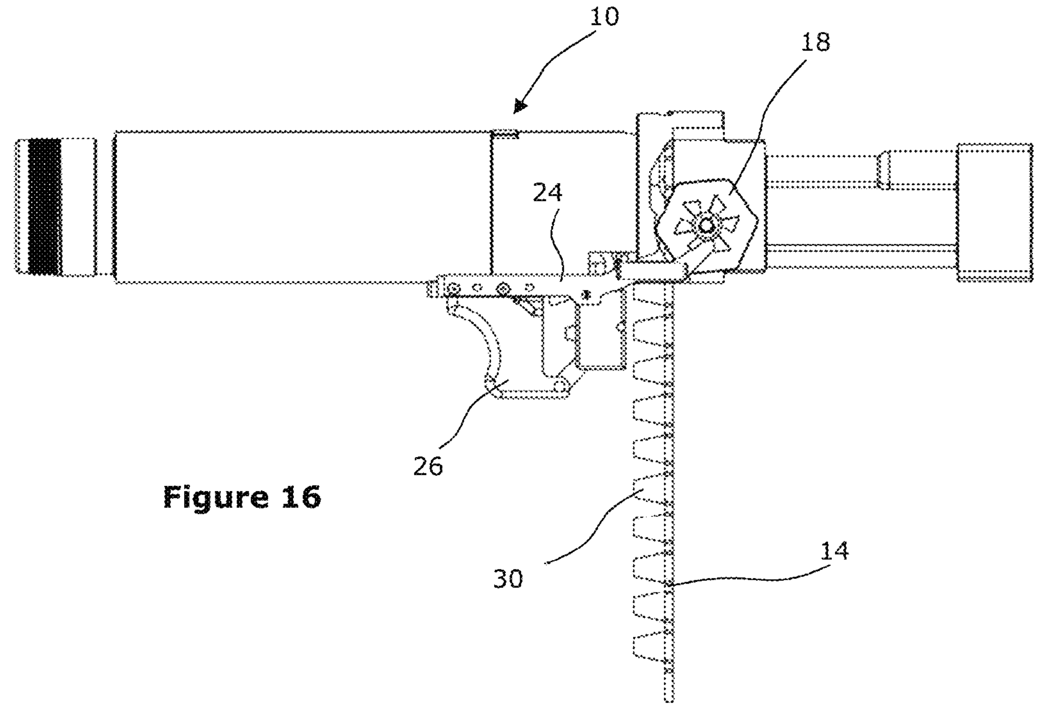
FIGS. 16 to 21 show a side view of the tool in successive steps over a single deployment cycle of the tool, including movement of the barrel, trigger and charge strip.
Figure 17:
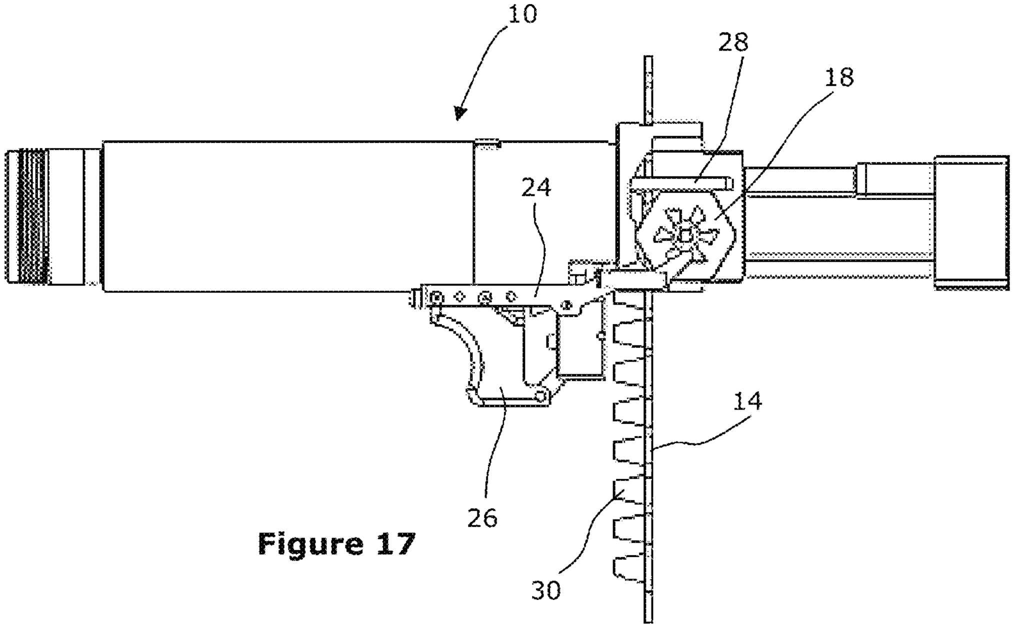
Figure 18:
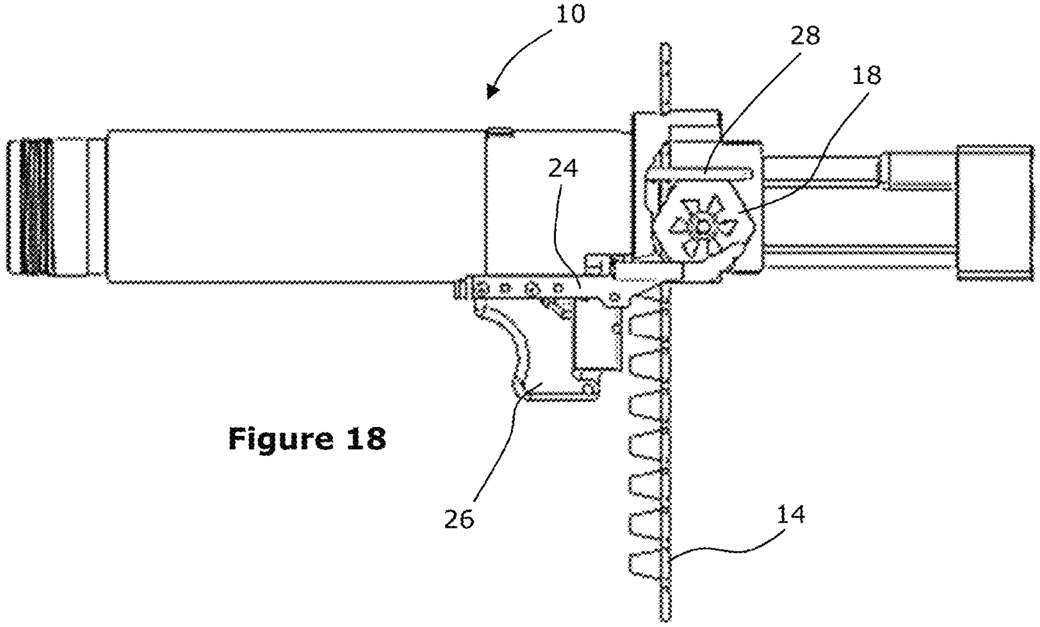
Figure 19:
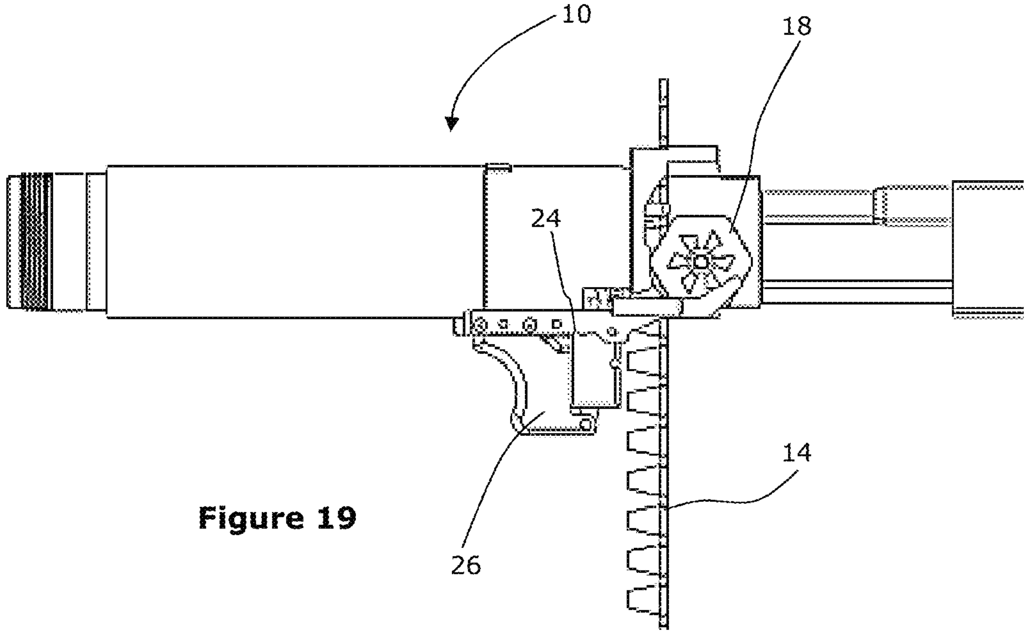
Figure 20:
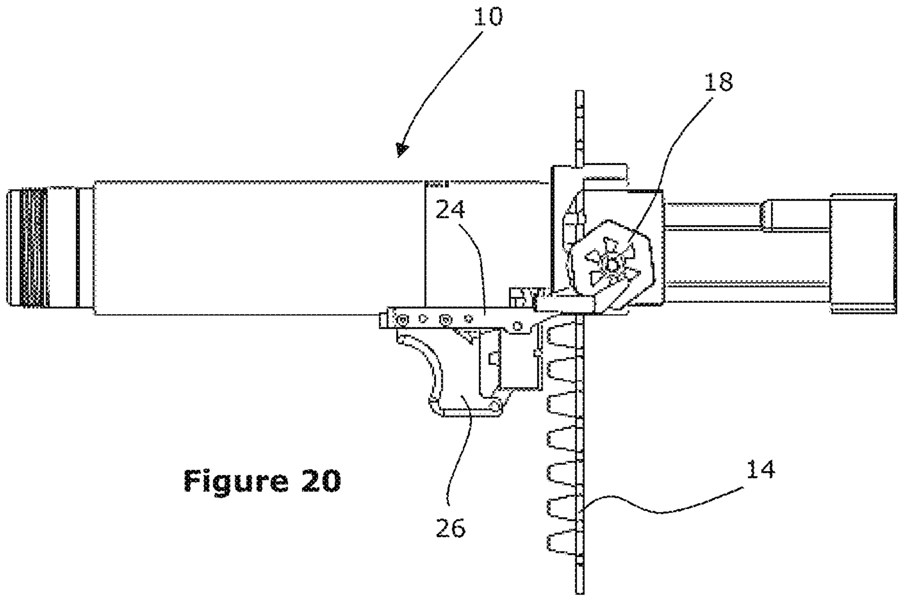
Figure 21:
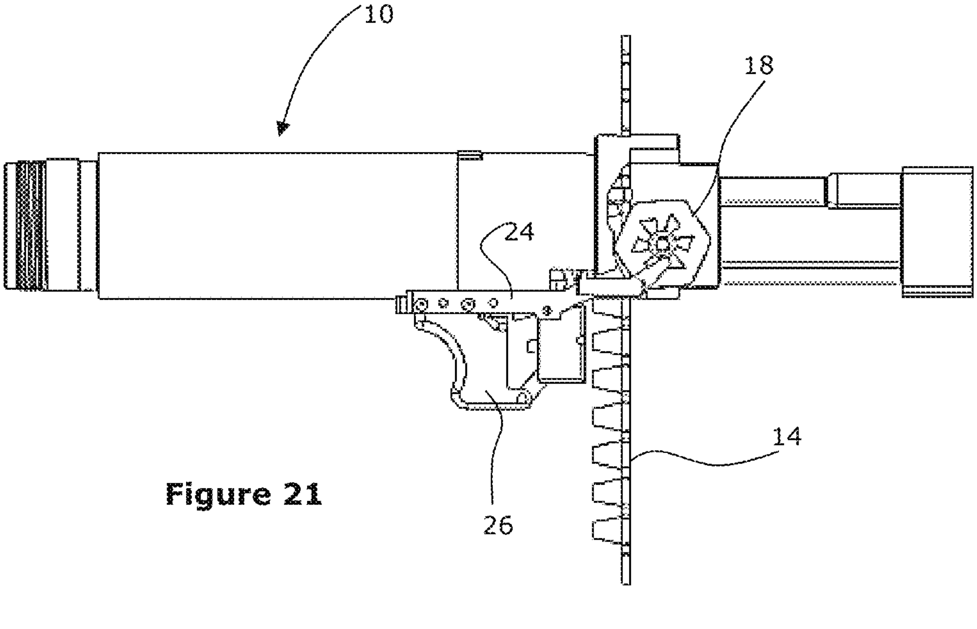

FIGS. 16 to 21 show a side view of the powder actuated fastening tool 10, progressively depicting steps during cyclic operation of the tool 10. Specifically, the steps shown include movement of the barrel 16 so as to enable functioning of the tool, firing of the tool while the barrel is in the closed position, opening of the barrel 16, then release of the trigger 26 so as to advance the powder charge strip 14 by virtue of the charge advance apparatus 12. FIG. 16 shows the tool 10 prior to closing the barrel 16; FIG. 17 shows the barrel 16 in the closed position; FIG. 18 shows the trigger 26 pulled back; FIG. 19 shows the barrel 16 being returned to the open position; FIG. 20 shows the trigger 26 during release back toward a rest condition during which movement the rotatable ratchet 18 is driven to move the strip 14 through the tool 10; and FIG. 21 shows the tool 10 with the trigger fully returned to the rest condition and with a new charge ready for the next cycle in which the barrel 16 will be closed over the new charge. FIG. 16 shows the tool in the uncocked state; FIG. 17 shows the tool cocked (note that the lockout pin aligns and locks the ratchet wheel); FIG. 18 shows the trigger actuated (the protrusion on the charge advance lever has clicked over the ramp on the ratchet wheel); FIG. 19 shows the tool uncocked (the lockout pin has retracted, freeing rotation of the ratchet wheel); FIG. 20 shows the trigger released (the charge advance lever retracts, rotating the charge advance wheel clockwise, as shown, the charge strip is thereby advanced one slot); and FIG. 21 shows the tool 10 back in the uncocked state.

Figure 26:
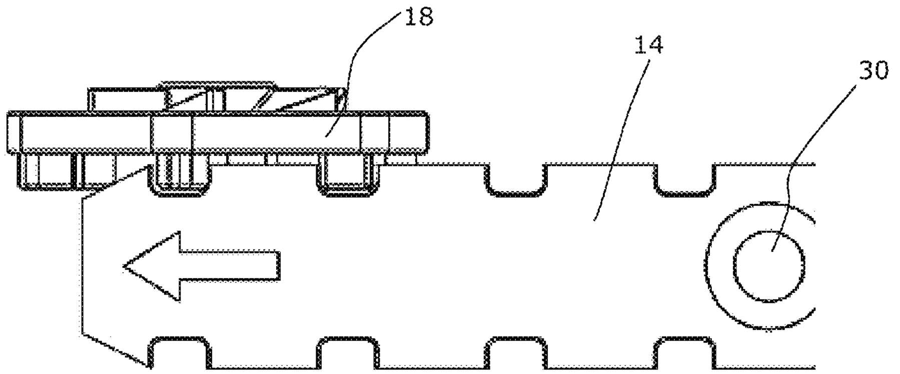

FIGS. 22 to 26 depict initial insertion of the charge strip 14 into the tool 10, specifically showing interaction of the charge strip 14 with the rotatable ratchet 18. Initially, as can be seen, the charge strip 14 may not engage with the rotatable ratchet 18 which, by virtue of the central spring 42, is able to ride up and over an edge of the charge strip 14 until it engages with the receptacles 22 of the strip 14, as shown in FIG. 26.

Accordingly, FIGS. 22 to 26 show insertion of the charge strip 14. These drawings show the process of inserting a charge strip into the tool.

Due to the first slot in the charge strip 14 having a different pitch to the rest of the strip 14, a method of enabling the ratchet wheel pins 20 to skip the first slot is required. To achieve this, the ramped surface of the first slot in the charge strip 14 is used to lift the ratchet wheel 18 out of the way until the charge strip 14 has been inserted far enough for the first pin to engage with the slot.

Figure 22:
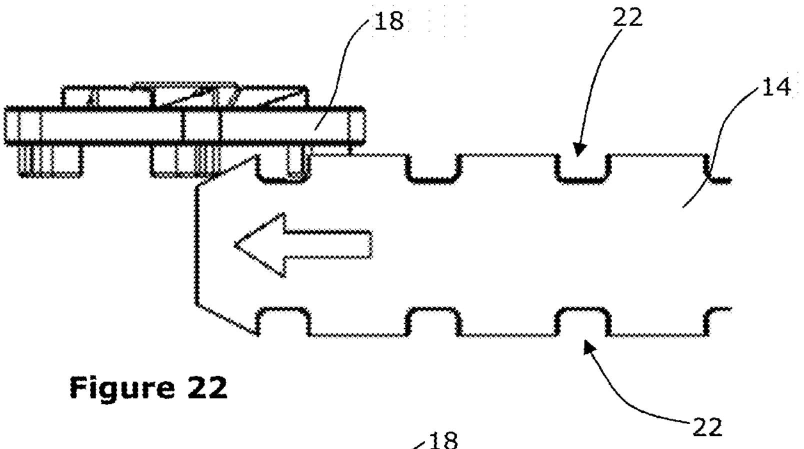
FIGS. 22 to 26 show successive steps in initial loading of the strip into the tool and, in particular, engagement of teeth of the ratchet with the strip.
Figure 23:
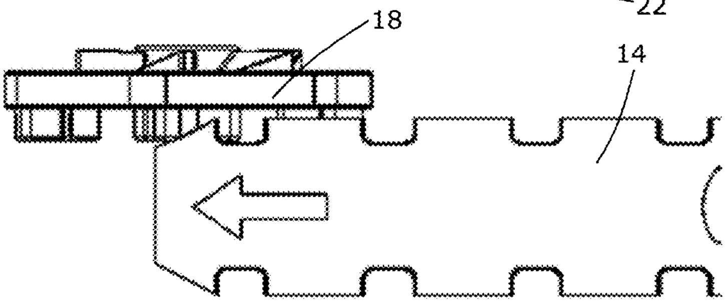

Upon strip insertion into the tool 10, the ramped leading edge of the strip 14 engages with the first pin of the ratchet wheel 18 (see FIG. 22). This causes the ratchet wheel 18 to rotate until the next pin contacts the back of the charge strip 14 (see FIG. 23). As the charge strip 14 is pushed through, the ratchet wheel 18 lifts due to the angled contact with the charge strip 14 (see FIG. 24) until the ratchet wheel's first pin is above the charge strip slot (see FIG. 25). When the charge strip 14 is pushed further, the ratchet wheel 18 drops down into the first slot in the charge strip 14 and is fully engaged (see FIG. 26). FIG. 22 shows the strip inserted; FIG. 23 shows the ratchet wheel 18 engaged; FIG. 24 shows the ratchet wheel 18 lifting; FIG. 25 shows the ratchet wheel 18 completely lifted; and FIG. 26 shows the ratchet engaged in first slot.

Figure 27:
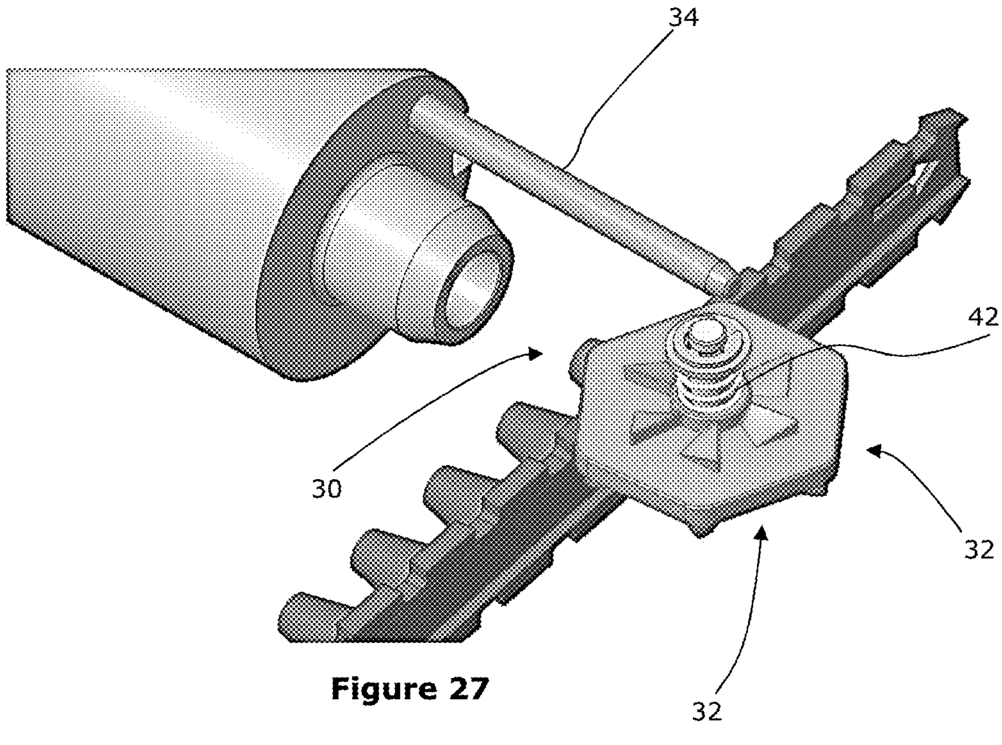
FIG. 27 shows detail of the barrel and ratchet with the barrel in the open position.
Figure 28:
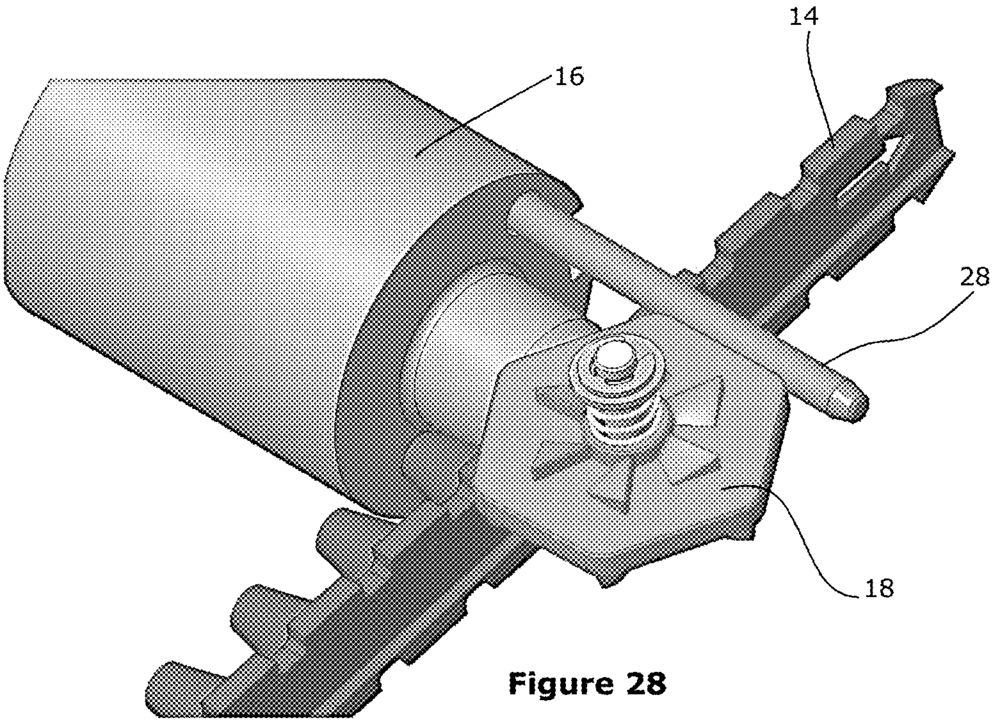
FIG. 28 shows a rear perspective view of the ratchet and barrel, with the barrel in the closed position.
Figure 29:
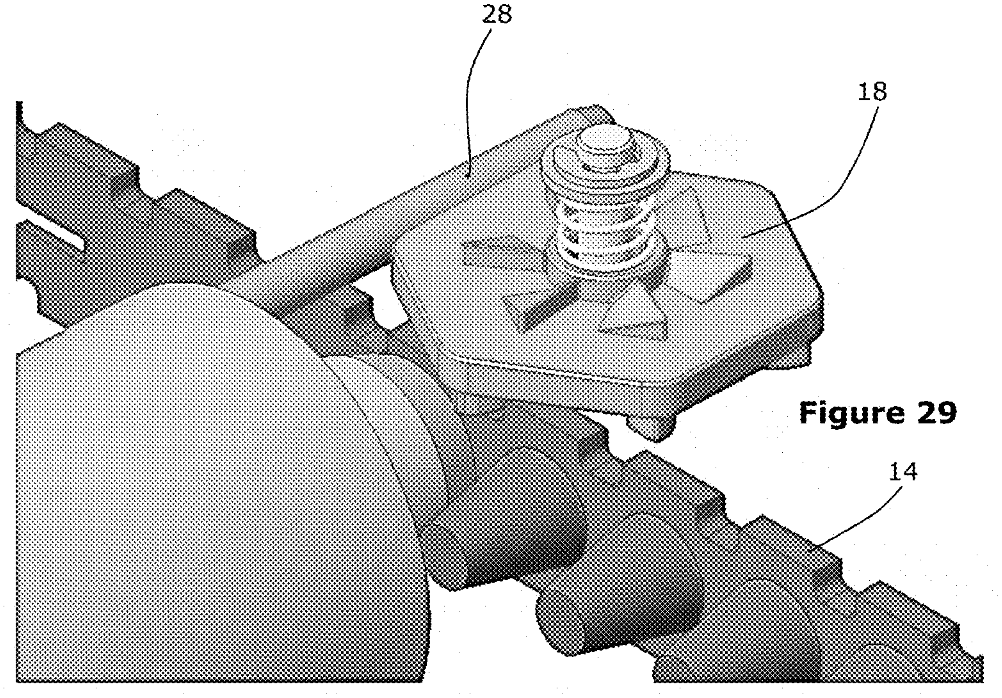
FIG. 29 shows a front perspective view of the ratchet and barrel, with the barrel in the closed position.

FIGS. 27 to 29 show perspective views of the barrel 16, rotatable ratchet 18 and alignment member 28 in the open position (FIG. 27) as well as in the closed position (FIG. 28 and FIG. 29). In particular, FIGS. 27 to 29 show detail of the barrel 16, rotatable ratchet 18 and alignment member 28 showing the manner in which they interact with the powder charge strip 14.

While various embodiments of the present invention have been described above, it should be understood that they have been presented by way of example only, and not by way of limitation. It will be apparent to a person skilled in the relevant art that various changes in form and detail can be made therein without departing from the spirit and scope of the invention. Thus, the present invention should not be limited by any of the above described exemplary embodiments.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

We claim:

1. A powder actuated fastening tool configured to receive a powder charge strip, the powder actuated fastening tool comprising:

a barrel slidably movable from an open position to a closed position, wherein when the powder charge strip is received by the powder actuated fastening tool, in the open position the barrel is spaced from a powder charge of the powder charge strip, and in the closed position the barrel encloses the powder charge of the powder charge strip;

a charge advance apparatus including a rotatable ratchet including teeth engagable with the powder charge strip when the powder charge strip is received by the powder actuated fastening tool and configured to advance the powder charge strip relative to the barrel; and an alignment member connected to and extending from the barrel such that when the barrel moves a distance, the alignment member moves the same distance, the alignment member configured to move relative to the rotatable ratchet when the barrel is moved from the open position to the closed position to ensure the powder charge of the powder charge strip is in alignment with the barrel.

2. The powder actuated fastening tool of claim 1, which includes a trigger, wherein the charge advance apparatus is configured to cause rotation of the rotatable ratchet in response to actuation of the trigger, wherein rotation of the rotatable ratchet is configured to cause advancement of the powder charge strip relative to the barrel.

3. The powder actuated fastening tool of claim 1, which includes a trigger, wherein the charge advance apparatus is configured to cause rotation of the rotatable ratchet in response to release of the trigger, wherein rotation of the rotatable ratchet is configured to cause advancement of the powder charge strip relative to the barrel.

4. The powder actuated fastening tool of claim 1, wherein the rotatable ratchet is hexagonal.

5. The powder actuated fastening tool of claim 1, wherein the rotatable ratchet includes a plurality of ratchet ramps.

6. The powder actuated fastening tool of claim 5, wherein the teeth extend in a first direction from a first surface of the rotatable ratchet and the plurality of ratchet ramps extend in an opposite second direction from a second surface of the rotatable ratchet.

7. The powder actuated fastening tool of claim 1, wherein the alignment member is fixedly connected to the barrel.

8. The powder actuated fastening tool of claim 1, wherein when the barrel is in the closed position, the alignment member engages the rotatable ratchet to prevent rotation of the rotatable ratchet.

9. The powder actuated fastening tool of claim 1, wherein when the barrel is in the closed position, the alignment member engages one of a plurality of straight sides of the rotatable ratchet to prevent rotation of the rotatable ratchet.

10. A powder actuated fastening tool configured to receive a powder charge strip, the powder actuated fastening tool comprising:

a barrel slidably movable from an open position to a closed position, wherein when the powder charge strip is received by the powder actuated fastening tool, in the open position the barrel is spaced from a powder charge of the powder charge strip, and in the closed position the barrel encloses the powder charge of the powder charge strip;

a trigger;

a charge advance apparatus including a rotatable ratchet including teeth engagable with the powder charge strip when the powder charge strip is received by the powder actuated fastening tool, wherein in response to movement of the trigger, the charge advance apparatus causes rotation of the rotatable ratchet to advance the powder charge strip relative to the barrel; and an alignment member connected to and extending from the barrel such that when the barrel moves a distance, the alignment member moves the same distance, the alignment member configured to move relative to the rotatable ratchet when the barrel is moved from the open position to the closed position to ensure the powder charge of the powder charge strip is in alignment with the barrel.

11. The powder actuated fastening tool of claim 10, wherein the movement of the trigger occurs due to actuation of the trigger.

12. The powder actuated fastening tool of claim 10, wherein the movement of the trigger occurs due to release of the trigger.

13. The powder actuated fastening tool of claim 10, wherein the rotatable ratchet is hexagonal.

14. The powder actuated fastening tool of claim 10, wherein the rotatable ratchet includes a plurality of ratchet ramps.

15. The powder actuated fastening tool of claim 14, wherein the teeth extend in a first direction from a first surface of the rotatable ratchet and the plurality of ratchet ramps extend in an opposite second direction from a second surface of the rotatable ratchet.

16. The powder actuated fastening tool of claim 10, wherein the alignment member is fixedly connected to the barrel.

17. The powder actuated fastening tool of claim 10, wherein when the barrel is in the closed position, the alignment member engages the rotatable ratchet to prevent the rotatable ratchet from rotating, thereby preventing the powder charge of the powder charge strip from moving out of alignment with the barrel.

18. The powder actuated fastening tool of claim 10, wherein when the barrel is in the closed position, the alignment member engages one of a plurality of straight sides of the rotatable ratchet to prevent rotation of the rotatable ratchet.

19. A powder actuated fastening tool configured to receive a powder charge strip, the powder actuated fastening tool comprising:

a barrel slidably movable from an open position to a closed position, wherein when the powder charge strip is received by the powder actuated fastening tool, in the open position the barrel is spaced from a powder charge of the powder charge strip, and in the closed position the barrel encloses the powder charge of the powder charge strip;

a charge advance apparatus including a rotatable ratchet including teeth engagable with the powder charge strip when the powder charge strip is received by the powder actuated fastening tool and configured to advance the powder charge strip relative to the barrel, wherein the rotatable ratchet includes a plurality of ratchet ramps, and wherein the teeth extend in a first direction from a first surface of the rotatable ratchet and the plurality of ratchet ramps extend in an opposite second direction from a second surface of the rotatable ratchet; and an alignment member movable by the barrel, the alignment member configured to move relative to the rotatable ratchet when the barrel is moved from the open position to the closed position to ensure the powder charge of the powder charge strip is in alignment with the barrel.

20. The powder actuated fastening tool of claim 19, which includes a trigger, wherein the charge advance apparatus is configured to cause rotation of the rotatable ratchet in response to actuation of the trigger, wherein rotation of the rotatable ratchet is configured to cause advancement of the powder charge strip relative to the barrel.

* * * * *